United States Patent [19]

Johnson

[11] 3,900,571

[45] Aug. 19, 1975

[54] PROCESSING OF FRUIT WITHOUT EXPOSURE TO AIR

[75] Inventor: Wallace J. S. Johnson, Berkeley, Calif.

[73] Assignee: Up-Right, Inc., Berkeley, Calif.

[22] Filed: Sept. 24, 1971

[21] Appl. No.: 183,334

[52] U.S. Cl. .................... 426/15; 99/276; 426/312; 426/328; 426/333; 426/474
[51] Int. Cl.² ...................... C12G 1/00; A23B 7/00
[58] Field of Search ......... 99/35, 154, 189, 48, 155, 99/276; 426/15, 312, 316, 320, 328, 331, 333, 474

[56] References Cited
UNITED STATES PATENTS

| | | | |
|---|---|---|---|
| 1,325,094 | 12/1919 | Hieber | 99/155 |
| 2,047,935 | 7/1936 | Beal et al. | 99/155 |
| 2,139,408 | 12/1938 | Heuser | 99/35 X |
| 3,071,469 | 1/1963 | Krabbe et al. | 99/48 |
| 3,233,396 | 2/1966 | Gallo | 99/35 X |

*Primary Examiner*—David M. Naff
*Attorney, Agent, or Firm*—Phillips, Moore, Weissenberger, Lempio & Strabala

[57] ABSTRACT

A method wherein harvested grapes are put into an inert gas atmosphere immediately after being harvested in the field and the grapes are kept in an inert atmosphere, out of contact with oxidizing air, as they are taken from the field to the winery and at all times during the various process steps at the winery. Inert gas under pressure is used to move the harvested grapes and the succeeding processed wine juice from one station to another to prevent contamination by pumps. Carbon dioxide generated during the fermentation step is used as the source of inert gas.

21 Claims, 3 Drawing Figures

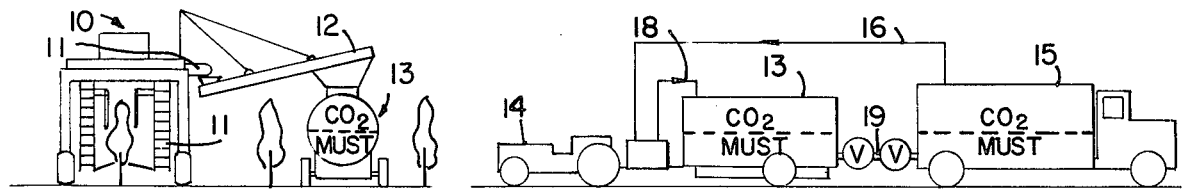
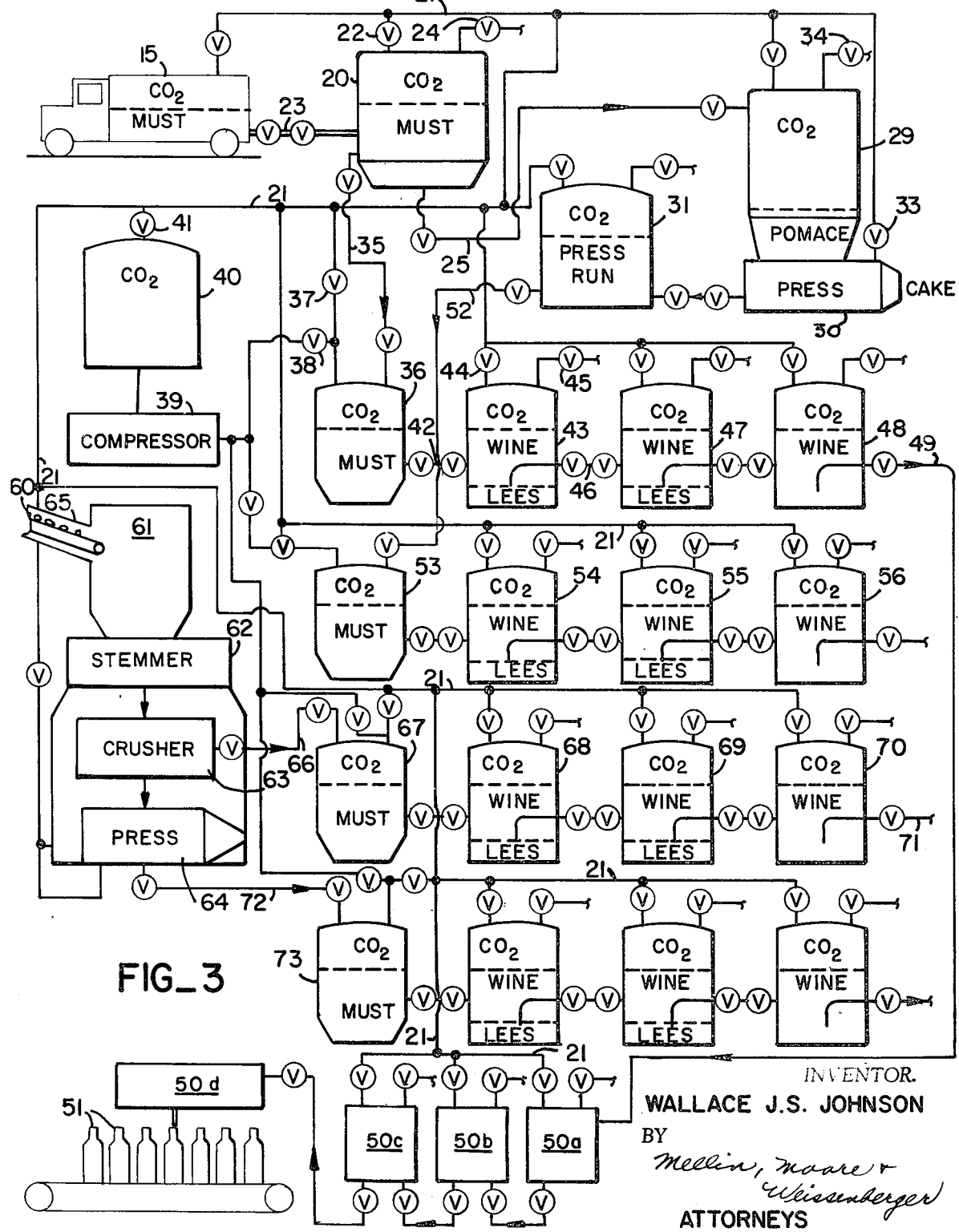

PROCESSING OF FRUIT WITHOUT EXPOSURE TO AIR

BACKGROUND OF THE INVENTION

This invention relates to the crushing and handling of fruit in general and to grapes in particular. It is a well-known fact that exposure of the flesh of most fruits to air, for even a short time, causes oxidation of the flesh and a resulting loss of aroma and flavor. Such oxidation is well illustrated by taking a bite from an apple and witnessing, within minutes, the oxidized browning of the flesh. The loss of flavor and aroma is readily apparent from the second bite.

Grape pulp is highly susceptible to oxidation. Under current conventional methods grape pulp (must) and the wine made therefrom is exposed to air many times during field harvesting, hauling to the winery and during the various wine-making steps at the winery. Each exposure results in some oxidation and detriment to the quality of the final product.

The problem of oxidation begins in the fields, as the grapes are harvested. Even with manual harvesting, many grapes will split, exposing the flesh to air. With mechanical harvesting equipment the problem is aggravated since the grapes are harvested by rods or the like which beat against the vines to dislodge the grape bunshes thereof, and many of the individual grapes are crushed during such beating.

After harvesting, whether manually or by machine, the grapes are hauled to a winery. During such time, the grapes are exposed to air so that any open flesh has an opportunity to oxidize. Also, the grapes are generally hauled in open trucks, exposing the harvested grapes to the sun, dust, insects and other air-borne contaminants.

At the winery the grapes are crushed and pressed, again in the presence of oxidizing air, and the juice delivered to a fermenting vessel. In fermentation, the sugar in the grape must decomposes, in the presence of yeast cells, to ethyl alcohol and carbon dioxide gas, as follows:

$$C_6H_{12}O_6 \rightarrow 2C_2H_5OH + 2CO_2.$$

Conventionally, fermentation is carried out either in an open vessel with the $CO_2$ being dissipated to air, or in a closed vessel wherein the $CO_2$ gas pressure is used for circulation of the must during fermentation and is then dissipated to atmosphere.

Following fermentation, the fermented wine is drawn off and transferred to closed vessels for aging. As the wine ages, sediment (lees) in the wine settles out. Periodically, the wine is racked off, i.e., drawn off at the lees, and transferred to another closed vessel for further aging and settling. Eventually, the wine is ready for bottling. During each racking, the wine is exposed to oxidation by being pumped into air-filled tanks.

In conventional practices, the must and wine are moved between processing stations by pumps, with a consequent chance of deleterious exposure of the must and wine to grease, dirt, air leakage, agitation or contact with metals which adversely affect the flavor of the wine.

SUMMARY OF THE INVENTION

The carbon dioxide produced as a by-product during fermentation of grape juice is heavier than air and forms a blanket or layer on top of the juice which serves to exclude oxygen in the air from coming into oxidizing contact with the fermenting juice. This protective function of the inert non-oxidizing carbon dioxide gas has not, however, been used prior to the fermentation step to prevent undesirable oxidation. Nor has this function been utilized in the wine-making process following the fermentation step to prevent unwanted oxidation.

One of the chief purposes of the present invention is to provide a method to prevent unwanted oxidation throughout the entire wine-making operation, from vine to bottle, wherein the grapes harvested in the field are put into a container having an inert gas atmosphere therein at the earliest possible time following harvesting, and the grapes, must and wine are kept in containers having an inert non-oxidizing atmosphere at all times until the wine is bottled.

A further object of the invention is to utilize the energy available from compressed gas to eliminate the need for pumps and their attendant possibility of product contamination. Thus, when it is desired to transfer the contents of one container to the next, the pressure of the inert gas atmosphere in the first container is increased, pushing the contents to the next container which is also initially filled with inert gas but at a lower pressure.

Yet further, the invention has an important aspect in that up to now the carbon dioxide generated during fermentation has simply been wasted to atmosphere as an unusable by-product of the fermentation process. The present invention now enables this previously wasted gas to be a part of a completely integrated process wherein the grapes, must and wine are protected by an inert, non-oxidizing gas in the entire wine-making process, and wherein any movement of must or wine throughout the entire process is by pressured gas rather than by pumps.

The adequacy of generation of carbon dioxide for the purposes of the present invention is assured because grape must typically contain approximately 20% sugar by weight. Thus, a ton of must would contain approximately 400 pounds of sugar, which decomposes to produce approximately 185 pounds of carbon dioxide. Usage of carbon dioxide under process described herein is indicated, for example, by the fact that it takes only 50 pounds of carbon dioxide gas to push 12 tons of must into a tank truck. This 12 tons of must contains 4,800 pounds of sugar, which when fermented releases over 2,200 pounds of carbon dioxide gas, at whatever pressure the fermentation tank's bursting strength will permit.

Thus, the former by-product now is utilized as a cost-free, useful product and a means to greater wine quality. Browning of wine color, loss of aroma and flavor, spoilage by vinegarization can now all be avoided.

BRIEF DESCRIPTION OF THE DRAWINGS

In the drawings forming a part of this application, and in which like parts are designated by like reference numerals throughout the same:

FIG. 1 illustrates the harvesting operation and the initial introduction of the harvested grapes into an inert gas atmosphere;

FIG. 2 illustrates the transfer of crushed grapes in the field to a tank truck;

FIG. 3 is a schematic view of a winery operation.

DESCRIPTION OF THE PREFERRED EMBODIMENT

Fig. 1 depicts generally the first step in the overall wine-making operation, namely, the harvesting of the grapes in the field. A mechanical harvester 10 is driven down a row of grapevines and vines are struck with suitable striking members to dislodge the bunches of grapes from the vines. The grape bunches are caught and carried upwardly and then outwardly by conveyor belts 11 on the machine. If desired, machines for such harvesting may be such as are shown in U.S. Pat. No. 3,601,965, or in Claxton and Horn application Ser. No. 101,910, filed Dec. 28, 1970, which application has been assigned to the assignee of the present application.

The grape bunches are then dumped by the last conveyor 11 into an enclosed chute 12 wherein the stems are removed and the grapes are crushed to form a must, i.e., grape pulp, skins, seeds and juice, which drains into the tank trailer 13, the trailer being towed parallel to and at the same speed as the harvesting machine. The tank trailer is initially filled with an inert gas, such as carbon dioxide, and as the tank trailer fills with must the gas is displaced upwardly into and then through the crusher chute, countercurrent to the movement of grapes through the chute, the gas exiting from the chute at the point where the grapes enter the chute. If desired, a crusher chute such as is shown in my copending application Ser. No. 183,333, filed on Sept. 24, 1971; now U.S. Pat. No. 3,730,443, and entitled "FIELD CRUSHER FOR GRAPES," may be used for this purpose. Thus, almost immediately after the grape bunches are harvested they are placed in an inert gas atmosphere to exclude oxidizing air from coming into contact with the grapes. The grapes are likewise protected from air contact during the stemming and crushing and while the must is within the tank trailer.

If desired, the grapes may be harvested and stemmed and crushed in the field in an inert gas atmosphere by apparatus as shown in my copending application Ser. No. 107,176, filed Jan. 18, 1971, now U.S. Pat. No. 3,714,887 and entitled "APPARATUS FOR CRUSHING FRUIT IN AN INERT GAS."

After the tank trailer 13 has been filed with must, it is towed by its tractor 14 to the end of a row of vines to meet tank truck 15, the latter being filled with carbon dioxide gas. The carbon dioxide gas is withdrawn from the enclosed tank on the truck through line 16, compressed by compressor 17 and discharged under pressure through line 18 into tank trailer 13. The pressure of the incoming carbon dioxide forces the must from the tank trailer through line 19 into the tank truck. The must remains protected from air contact during this transfer since only carbon dioxide is present in both the tank trailer and tank truck. Following the transfer, the valves on the tank truck are closed to seal the tank against air entry. During the transfer, the tank trailer becomes again filled with carbon dioxide and it is towed back to receive more must from the harvester.

The tank truck 15 is then driven to the winery (FIG. 3) and parked adjacent a must storage tank 20. This tank is initially charged with carbon dioxide gas, the gas being delivered from the carbon dioxide manifold line 21 through valve 22 into tank 20. Carbon dioxide gas from manifold line 21 (typically under 10-20 psig pressure) is then injected under pressure into tank truck 15 to force the must therein to flow through line 23 into storage tank 20. Gravity will, of course, assist the flow when the must level in the tank truck is higher than the level in tank 20, as is true in any of the transfer operations described below. In this transfer, valve 22 is closed and valve 24 is open so that the interior of tank 20 is at atmospheric pressure. As the tank fills, the must displaces the carbon dioxide therein out of the top of tank 20 through valve 24 to atmosphere. If desired, the displaced gas may be collected, compressed and returned to the carbon dioxide manifold 21, instead of wasting it to atmosphere.

In the event that it is desired to remove the seeds and skins before fermentation (as with white wines) the free-run juice which settles in tank 20 is tranferred through line 35 to fermentater 36. This is accomplished by closing tank valve 24 and opening valve 22 to admit carbon dioxide gas into the storage tank, forcing the must to flow to the fermenter.

The skins and seeds (pomace) are discharged through line 25 from the storage tank 20 into hopper 29 to feed downwardly into press 30. Again, the press 29 may be of any conventional type wherein the pomace is pressed with the press-run juice being delivered to a storage receptacle 31 and the pressed seed-and-skin cake 32 being discharged from the press. Such press is shrouded, however, and connected through valve 33 to the carbon dioxide manifold so that carbon dioxide is delivered to the press to flow therethrough and up through the hopper 29, exiting through valve 34 to atmosphere to protect the pomace and press-run juice from air contact.

The free-run juice in the enclosed fermenter 36 undergoes fermentation wherein the sugar in the must decomposes into ethyl alcohol ($C_2H_5OH$) and carbon dioxide gas. The carbon dioxide generated during fermentation passes upwardly through regulating valvle 37 to the carbon dioxide manifold 21. Excess carbon dioxide may pass through valve 38 to compressor 39 wherein it is compressed and then stored in a pressurized container 40. Gas from this container can exit through regulating valve 41 to provide a continual supply of pressurized gas to the carbon dioxide manifold.

After fermentation, the wine is transferred from the fermenter 36 through valved line 42 to an enclosed aging tank 43. As before, the tank 43 is charged with carbon dioxide gas through valve 44 before the transfer takes place, with valve 44 being then closed and valve 45 being left open to place the tank 43 at atmospheric pressure. Upon opening the valves in line 42, the carbon dioxide gas under pressure in the fermenter will force the wine into tank 43, the carbon dioxide therein being displaced out through valve 45.

As the wine ages in tank 43, the lees (dregs) will gradually settle to the bottom of the tank. After a suitable length of time, the wine is racked to draw the wine off from the lees. Again, this is accomplished by introducing carbon dioxide gas under pressure into tank 43 to force the wine through line 46 into the next tank 47 which is filled with carbon dioxide gas at atmospheric pressure.

The wine, after further aging, is similarly racked into tank 48, and after further aging, the wine is forced through line 49 to and through further processing stations 50a, 50b and 50c. For example, station 50a may be wooden barrels in which it is desirable to age red wine. Station 50b may be a centrifuging station, station 50c may be a container wherein the wine is filtered. In carrying out the invention, the processing at these stations will be carried out in an inert gas atmosphere, with gas under pressure being used to transfer the wine from one station another, as previously described. It is of course to be appreciated that the three aging tanks and three stations illustrated are merely exemplary of aging and processing steps and that a vintner will select the desired manner in which to age and process a particular wine.

After the last process selected by the vintner, the wine is transferred to a bottling station 50d and put into bottles 51.

The wine-making process thus described, utilizing freerun juice from grapes which have been protected from oxidation, sunlight and contamination from the vine to the bottle, will result in wine having the maximum quality and fragrance. In actuality, if the bottle is properly corked, the first time that the fragrance of the grape is released is when the bottle is opened by the utimate consumer.

Press-run juice, from press 30, is transferred by gas pressure through line 52 to the enclosed fermenter 53. The fermentation process and the succeeding rackings in tanks 54, 55 and 56 are the same as described above. The wine will then be further processed and bottled as described above. Although wine from press-run juice is inherently of lesser quality than that from free-run juice, the wine will be of highest possible quality and fragrance because of the protection from oxidation, sunlight and contamination that is given to it.

In some instances, vineyards may not be sufficiently mechanized, or other reasons may exist wherein it is not practicable or feasible for the grapes to be field-crushed and delivered as must to the winery in tank trucks as previously described. Instead, the grape bunches will be taken from the vineyard to the winery in conventional produce trucks. Although the full benefits of the invention cannot be realized because of such exposure of the harvested grapes to air, sunlight, dust, insects and other contaminants before they reach the winery, nevertheless the succeeding steps in the winery can be undertaken in such a way as to protect the grapes, must and wine from unwanted oxidation, contamination and acetification as would occur during conventional wine processing.

The grape bunches brought to the winery are deposited on a conveyor 60 and dumped into hopper 61. The bunches pass sequentially through a conventional stemmer 62, crusher 63 and press 64. The stemmer, crusher and press are shrouded and carbon dioxide gas under pressure is introduced into the shroud and the press from manifold 21 to exclude the presence of oxidizing air. The carbon dioxide passes upwardly through the stemmer and hopper, exiting out of the hopper chute 65 into which conveyor 60 extends. In this manner, the grapes are protected by carbon dioxide from the moment they enter the hopper chute.

If desired, the type of field stemmer and crusher shown in my above-mentioned application Ser. No. 107,176 entitled "APPARATUS FOR CRUSHING FRUIT IN AN INERT GAS", may be utilized at the winery for the stemmer 62 and crusher 63.

The free-run juice is drained from the crusher 63 through line 66 to fermenter 67. As before, carbon dioxide is produced through the decomposition of the sugar in the must, the carbon dioxide being delivered to the carbon dioxide manifold 21 and/or compressor 39 as previously described. After fermentation, the wine is successively racked in tanks 68, 69 and 70, the wine being finally delivered through line 71 for further processing and bottling. Similarly, the press-run juice from press 64 is delivered through line 72 to fermenter 73 for fermentation and subsequent handling as above described.

The various processing steps described above, such as stemming, crushing, pressing, fermenting, aging, racking, barrel storage, centrifuging, filtering and bottling are all conventional process steps in wine-making. Certain of these steps may be eliminated, or other conventional processing steps added, in accordance with standard practice. However, in carrying out these steps in accordance with the present invention, each container is maintained with a protective layer of inert, non-oxidizing gas covering the contents in the container so that the free oxygen in the air cannot come into contact with the contents. Likewise, in transferring contents from one container to the next, the contents are moved by gas pressure, thus avoiding the possibility of contamination by pumps.

As described above, the maximum benefits of the invention will be realized from a completely integrated system from the vine to the bottle. Such a system has two major parts, the field equipment for harvesting the grapes and transporting them to the winery, and the winery equipment for taking harvested grapes and turning them into wine. As previously mentioned, substantial benefits can be realized if only the winery is equipped to practice the invention and the grapes are harvested and brought to the winery by conventional methods.

Likewise, substantial benefits can be obtained if the previously described field equipment is used and the harvested grapes are then brought to a winery equipped only for conventional wine-making operations. Field crushing of harvested grapes is the most efficient and economical way to handle grapes prior to their delivery to the winery. The stems are disposed of in the field, and they may be left there for mulch purposes. Hauling costs to the winery are based more on bulk than weight and a ton of grapes occupies considerably more volume when in bunch form than when crushed to must form. Must is much easier to load into and out of trucks and other containers than grapes in bunch form. Further, in large-scale operations, delays may often result if the trucks used to take the grapes from the field to the winery are not ready when needed for filling, or if the trucks must wait at the winery to be unloaded. This is a critical time in handling of the grapes, and if conventional methods are used much undesirable oxidation of the grapes will take place prior to the winery operations. With the present invention such delays will not be detrimental to the grape must, since the must is protected from oxidation, sunlight and contamination at all times following the harvesting of the grapes.

Thus, with the present invention, the grape must is brought to the winery and discharged there with the least possible oxidation and contamination. Even if the winery to which the must is delivered is a conventional winery wherein some unwanted oxidation and contamination do occur before the wine is bottled, the resulting wine will still be much superior because of the initial protection that the grapes have received before their arrival at the winery.

Although the forgoing description has specifically described the handling of grapes and the processing of the grapes into wine, it is obvious that the method can be easily adapted to the harvesting and processing of other fruits or vegetables that are susceptible to deterioration from oxidation. As, for example, the harvesting of apples and the processing of apples into applesauce would present much the same problems since apple pulp oxidizes very rapidly. Carrying out of the harvesting and/or processing of apples in an inert gas atmosphere would provide desirable protection. However, since no fermentation would occur, there would be no free source of carbon dioxide as there is in wine-making, and such gas would have to be purchased.

Having thus described my invention, I claim:
1. A process for handling fruit, comprising:
   a. harvesting fruit in the field,
   b. surrounding the harvested fruit with an inert gas atmosphere while said harvested fruit is in the field,
   c. transporting the harvested fruit from the field to a fruit-processing plant,
   d. discharging the harvested fruit at the fruitprocessing plant into an enclosed receptacle,
   e. maintaining said harvested fruit in an inert gas atmosphere and out of contact with oxidizing air in said enclosed receptacle at said fruit-processing plant and at all times from the time it is first surrounded in the field with said inert gas atmosphere until it has been discharged into the enclosed receptacle at the fruit-processing plant.
2. A process as set forth in claim 1, wherein said fruit is grapes and said fruit-processing plant is a winery.
3. A process as set forth in claim 1, and further including:
   f. at least partially crushing said harvested fruit prior to the transportation of said fruit to the fruit-processing plant, said crushing being conducted in an inert gas atmosphere.
4. A process as set forth in claim 3, wherein said fruit is grapes and further including stemming said grapes as they are being crushed.
5. A process as set forth in claim 4 and further including:
   g. collecting the crushed grapes and juice therefrom in an enclosed tank as they are crushed, and maintaining said enclosed tank with an inert gas atmosphere therein,
   h. transferring the crushed grapes and juice therefrom said enclosed tank to an enclosed transportation vehicle by introduction of inert gas under pressure into said enclosed tank.
6. A process as set forth in claim 2 and further including:
   f. transferring the flesh and juice of the harvested grapes from said enclosed receptacle to an enclosed fermentation tank,
   g. stemming and crushing said grapes prior to the transfer into said fermentation tank, said stemming and crushing being conducted in an inert gas atmosphere,
   h. fermenting the juice in said fermentation tank,
   i. maintaining the flesh and juice of said grapes out of contact with oxidizing air at all times from said enclosed receptacle to and in said fermentation tank.
7. A process as set forth in claim 6 wherein gravity and inert gas under pressure alone are utilized as the motive force to discharge the harvested grapes into said enclosed receptacle and to transfer the flesh and juice of the grapes from said enclosed receptacle to said fermentation tank.
8. A process as set forth in claim 7 wherein the $CO_2$ generated during fermentation is utilized as the source of said inert gas.
9. A process as set forth in claim 6 and further including:
   j. transferring the fermented juice from the fermentation tank to an enclosed settling tank,
   k. maintaining the fermented juice out of contact with oxidizing air at all times from said fermentation tank to and in said settling tank.
10. A process as set forth in claim 9 wherein gravity and inert gas under pressure alone are utilized as the motive force to discharge the harvested grapes into said enclosed receptacle, to transfer the flesh and juice of the grapes from said enclosed receptacle to said fermentation tank and to transfer the fermented juice from said fermentation tank to said settling tank.
11. A process as set forth in claim 10 wherein the $CO_2$ generated during fermentation is utilized as the source of said inert gas.
12. A process as set forth in claim 9 and further including:
   l. transferring the fermented juice from said settling tank to other tanks, barrels, or processes,
   m. maintaining the fermented juice out of contact with oxidizing air at all times from said settling tank to and at said other tanks, barrels, or processes.
13. A process as set forth in claim 12 wherein gravity and inert gas under pressure alone are utilized as the motive force to discharge the harvested grapes into said enclosed receptacle, to transfer the flesh and juice of the grapes from said enclosed receptacle to said fermentation tank, to transfer the fermented juice from the fermentation tank to said settling tank and to transfer the fermented juice from the settling tank to said other tanks, barrels, or processes.
14. A process as set forth in claim 13 wherein $CO_2$ generated during fermentation is utilized as the source of said inert gas.
15. In a process for the conversion of harvested grapes into wine which utilizes a plurality of processing and storage containers interconnected for flow from one container to the next and in which fermentation of the grapes takes place in one of said containers:
   a. maintaining a layer of inert gas in contact with the contents of each container to prevent contact of said contents with oxidizing air,
   b. supplying inert gas under pressure to one of said containers and forcing the contents therein to flow to another container having a lower pressure therein
   c. collecting $CO_2$ has generated during the fermentation of the grapes and utilizing said gas as said inert gas.
16. A process for harvesting and handling grapes in the field and for processing said grapes into wine at a winery which process utilizes a plurality of processing and storage containers interconnectible for transfer of the contents from one container to the next and in which fermentation of the grapes takes place in one of said containers at the winery, said process comprising:
   a. harvesting said grapes in the field, b. immediately depositing said harvested grapes into a container in the field,
c. transferring the grapes from one container to the next sequentially through all of said containers,
d. maintaining a layer of inert gas in each container having harvested or processed grapes therein, said layer of inert gas being in sufficient contact with the contents of the container to prevent contact of such contents with oxidizing air,
e. maintaining said harvested or processed grapes out of contact with oxidizing air during transfer from one container to the next.

17. A process as set forth in claim 16 wherein $CO_2$ gas generated in the fermentation of the grapes is collected and used as the source of said inert gas.

18. A process as set forth in claim 16 and further including:
f. utilizing gravity and inert gas under pressure only as the motive forces to transfer the harvested or processed grapes from container to container, said inert gas being introduced under sufficient pressure into a container to force the contents of the container therein to a container having a lower internal pressure.

19. A process as set forth in claim 18 wherein $CO_2$ gas generated in the fermentation of the grapes is collected and used as the source of said inert gas.

20. In a process of converting harvested grapes to wine utilizing a first container wherein grapes are crushed, a second container wherein grape juice is fermented, a third container wherein sediment may settle from fermented juice and a fourth container wherein clear fermented juice may be stored, the method comprising:
maintaining all of said containers with a layer of inert gas covering the contents of said containers,
b. sequentially transferring the contents of said containers from the first to the second to the third to the fourth container,
c. maintaining said contents out of contact with oxidizing air at all times during the transfers from container to container,
d. using gravity and inert gas under pressure alone as the motive forces to effectuate transfer from one container to the next.

21. In a process as set forth in claim 20 wherein carbon dioxide gas generated in said second container during fermentation of the contents is collected and used as the source of said inert gas.

* * * * *